Patented Dec. 11, 1928.

1,694,594

UNITED STATES PATENT OFFICE.

BIRGER FJELD HALVORSEN, OF OSLO, NORWAY; ASSIGNOR TO NORSK HYDRO-ELEKTRISK KVAELSTOFAKTIESELSKAB, OF OSLO, NORWAY.

PROCESS FOR THE PURIFICATION OF GASES TO BE USED IN THE PRODUCTION OF AMMONIA.

No Drawing. Application filed February 3, 1927, Serial No. 165,762, and in Norway February 25, 1926.

This invention has for its object a process for the purification of gases to be used in the production of ammonia.

When producing ammonia from such elements as hydrogen and nitrogen, it is of the greatest importance that the gases are pure. Even a small quantity of impurities such as oxygen, water vapour, carbon monoxide and phosphoric compounds, etc., have a detrimental effect upon the catalyst, and have to be eliminated if a favourable result of operations is to be obtained.

It is therefore necessary, when producing ammonia in large quantities, to procure a very efficient and cheap purifying medium, which acts quickly and eliminates as much of the impurities as possible. In Norwegian Patent specification No. 38,207 a process is described for the purification of gases used in the synthesis of ammonia. Said process consists in using alkali or alkaline earth metals dissolved in, or moistened with liquid anhydrous ammonia.

It has been ascertained that when the gases are purified in this manner, they are freed from the detrimental impurities they contain, and which destroy the catalyst. Alkali and alkaline earth metals in a solution of $NH_3$ are rather expensive, however, and have certain drawbacks. The present invention is based on the discovery that compounds soluble in ammonia, especially those that are hygroscopic, or which under adsorption form compounds with the detrimental impurities in the gases, are particularly suitable for purification purposes. Besides being considerably cheaper than the above mentioned metals, they are capable, to a certain extent, of forming a solution in the ammonia, which may easily be tapped from same.

In accordance with these observations the gases to be purified are subjected to the action of purifying compounds dissolved or suspended in liquid ammonia.

It is indicated above that water vapour can be eliminated by means of hygroscopic salts, but also other impurities can be eliminated by means of inorganic or organic compounds, and it has also been discovered, that it is just these compounds, which are dissolved in liquid ammonia, that are especially effective. Said compounds, soluble in ammonia, will accordingly first be dissolved in liquid ammonia, and the fluid thus produced will be used for purifying the gases, as a perfectly effective purification is more easily achieved when the purifying medium is in the form of liquid. The vapour pressure of the ammonia is also reduced, and the purifying efficiency of the salts is greatly increased, owing to the purifying medium being dissolved. Of the solid substances, that can be used for the above purpose, nitrate of ammonia and nitrate of calcium are particularly worth mentioning. Also metal chlorides, cyanides, nitrates, etc.

It may be, however, that some of these salts do not dissolve very easily in liquid ammonia, and do not become totally dissolved until the salt has reacted with the impurities, wherefore this invention also includes the suspension of these salts in ammonia.

The following may be given as examples of how the above salts may be used:—

*Example No. 1.*

Calcined nitrate of calcium is dissolved in liquid ammonia in the proportion of 50 grammes of nitrate of calcium to 400 cubic centimetres of liquid ammonia at —20° C. and 100 atm. pressure. A liquid is then obtained which is capable of freeing both nitrogen and hydrogen gases from impurities, especially water vapour and carbonic acid.

*Example No. 2.*

Nitrate of ammonia is dissolved in liquid ammonia in which cuprous chloride is suspended in the proportion of 70 grammes of nitrate of ammonia, 30 grammes of cuprous chloride to 400 cubic centimetres of liquid ammonia at —20° C. and 100 atm. pressure. A liquid is then produced which is especially capable of freeing the gases from water vapour, carbonic acid and carbon monoxide.

When producing large quantities of ammonia for the manufacture of fertilizers, for instance, nitrate of lime or nitrate of ammonia, just the very materials suitable for the purification of gases are produced. Those impurities which are absorbed by the part of the production used for the purification of the gases, will not in any way reduce the fertilizing value of the products.

From this it will be understood, that many economical advantages are attached to such combinations. It is also possible, of course, to obtain the liquid ammonia necessary for the purifying medium by condensing it from the gases which have passed through the catalyst, and this may be carried out in that part of the system where it is desirable to purify the gases.

Claims:

1. Process for the purification of hydrogen-nitrogen mixtures, which consists in washing the mixture with a liquid ammonia containing inorganic salts capable of reacting with water, carbon di-oxide and carbon monoxide.

2. Process of purifying hydrogen-nitrogen gas mixtures, which comprises passing the mixture through liquid ammonia containing a plurality of salts capable of removing impurities from the gas mixture, at least one of which said salts is a nitrate.

In testimony whereof I have signed my name to this specification.

BIRGER FJELD HALVORSEN.